Aug. 18, 1936.    S. PALKIN    2,051,740
GAUGE FOR MEASUREMENT OF GAS PRESSURES
Filed March 20, 1935
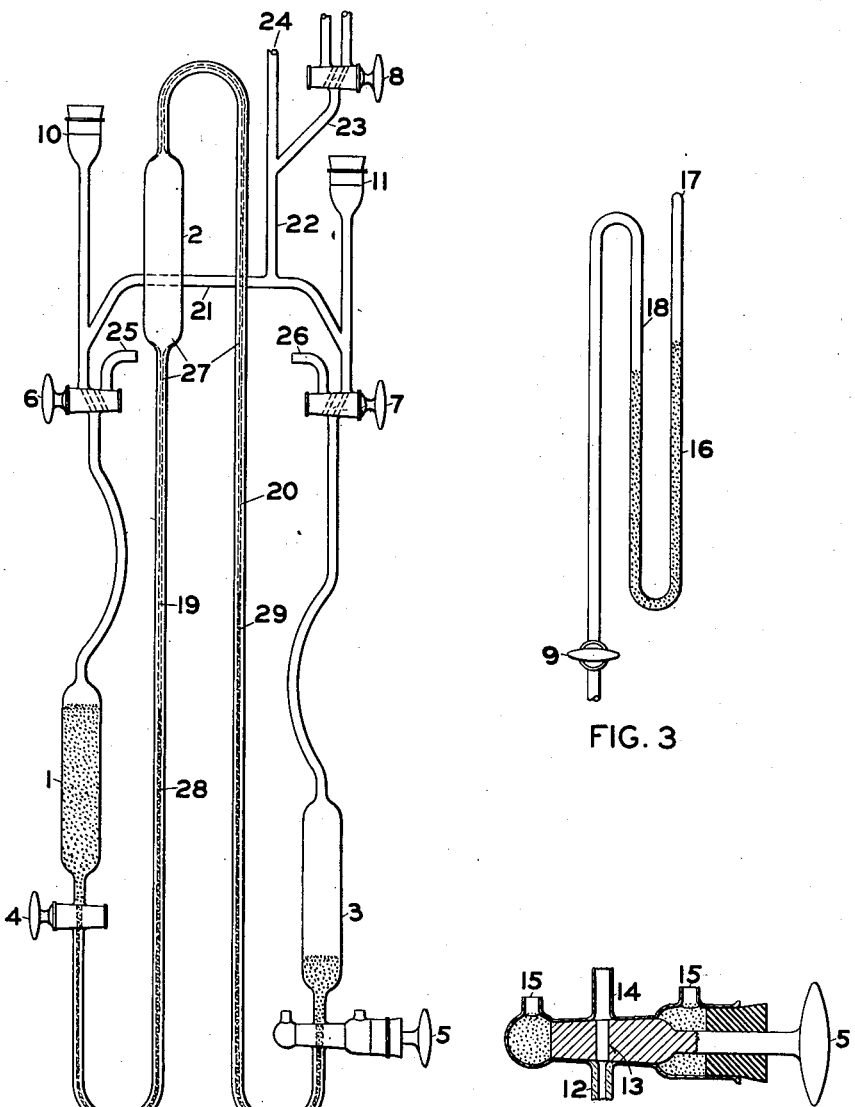
INVENTOR
SAMUEL PALKIN
ATTORNEY
C. W. Boyle

Patented Aug. 18, 1936

2,051,740

UNITED STATES PATENT OFFICE

2,051,740

GAUGE FOR MEASUREMENT OF GAS PRESSURES

Samuel Palkin, Washington, D. C., assignor to Henry A. Wallace as Secretary of Agriculture of the United States of America Application March 20, 1935, Serial No. 11,975

4 Claims. (Cl. 73—31)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a vacuum gauge for indicating pressure and changes in pressure of a gas at less than atmospheric pressure.

The object of this invention is to provide a convenient and simple means for measuring such pressure and pressure changes with high precision and accuracy, and to permit observation of such pressure changes continuously without intermittent manipulation for each observation as is the case with some gauges, such as the McLeod gauge.

Ordinary mercury manometers, known as the U-tube or U-type 16, Figure 3, permit a wide range of pressure measurements, but are comparatively coarse and insensitive. Pressure changes less than ½ mm. can not be read with any degree of accuracy. This is true also of the barometric type. These manometers, because of their simplicity of construction, the ease with which direct readings of pressure can be made, are probably the most widely used. Unlike the U type, however, the barometric type is affected by variation in atmospheric pressure and is thus unsuited for the reading of "absolute" pressures, correction for atmospheric changes having to be made with each reading.

As is well known, the actual reading of the U type is made possible by departure of the mercury from the closed end 17 when vacuum is applied to the open end 18, that is when the open end of the manometer is in communication with the gas system whose pressure is to be measured, and such pressure readings are indicated by the difference in height of the columns of mercury in the two legs of the U.

It is also obvious that if it were practicable to use lighter liquids in the ordinary U type manometer it would be possible to read smaller pressure differences than can be read on the mercury manometer, the degree of increased precision depending upon the relative specific gravities of the mercury and the lighter liquid used. However, unlike the heavy liquid mercury, the lighter liquids, as is well known, can not be dislodged from the closed end of an ordinary U type manometer, regardless of how low the pressure is made at the other end.

Heretofore the difficulty due to the impossibility of its dislodgment has been overcome by substituting for the closed end of the ordinary U, an open end in communication with a high-vacuum condensation pump (such as is in the Hickman gauge, J. Amer. Chem. Soc. December, 1930, p. 4728). In that gauge there is substituted for the Torricellian vacuum of the closed end of the ordinary mercury U type, a vacuous space maintained by operation of the condensation pump, the latter being an integral part of the gauge.

This invention makes possible the use of manometric liquids of low specific gravity such as paraffin oils, esters, etc., by its construction principles, without the need of any special or accessory high-vacuum condensation pump for the production of a reference vacuum. A good laboratory oil pump, or any other vacuum source, generally the same as used in connection with procuring the vacuum in the system whose pressure is to be measured, is sufficient for conditioning the gauge. With reasonable safeguard, as will be explained later, the gauge can be used either continuously or intermittently without the need for reconditioning, although conditioning is in itself a very simple process and can be repeated for checking purposes as often as desired. Thus the advantages in precision and accuracy possible with light liquids are secured in a simple manner. With such a manometer, if, for example, paraffin oil is used, a pressure difference of 1 mm. in oil level is equivalent to 1/15 mm. or less of mercury and pressure changes of 1/30 mm. or less may be read with precision. The construction is furthermore such that the oily liquid is very responsive to small pressure changes.

As will be explained with the aid of the drawing, the manometer is in effect a double-U tube type in which both oil and mercury are employed, the latter serving, however, only as a mobile "backing" medium for the oil column. Thus, the mercury provides a means for rendering free movement of the oil column possible. The mercury column, which backs the oil, can, by the use of this gauge, be separated from the oil in such a way as to create a Torricellian vacuum between the mercury and oil, comparable to the Torricellian vacuum in the closed end of the simple mercury U-type manometer.

The following explanation serves to show the construction of a gauge of this type, the manner of preparation or conditioning, and the application. I do not limit myself to this exact form nor to the specific manometric liquid used in the illustration.

I attain the objects outlined above by the device illustrated in the accompanying drawing in which:

Figure 1 is a detailed view of the entire gauge;
Figure 2 is a view of the preferred stopcock and
Figure 3 is a view of a U-type manometer which may be attached to the improved device for comparison of the readings of the two manometers.

Reservoirs 1, 2 and 3 are joined hermetically as indicated by thick walled capillary tubes of approximately 1½ mm. bore for the tube 19 between reservoirs 1 and 2, and 2½ mm. for the tube 20 between reservoirs 2 and 3. Reservoir 1, generally speaking, serves as the mercury reservoir, 3 as the oil, and 2 as a temporary common reservoir for both, also as a degassing chamber and as a space for the Torricellian vacuum, comparable to the closed end of the simple U type mercury manometer, only much larger.

Stopcocks 4 and 5 directly below reservoirs 1 and 3, respectively, serve to lock the two liquids, mercury and oil, respectively, as necessary. The three-way stopcocks 6 and 7 together with ordinary connecting tubing 21, 22, 23, 25, 26 serve primarily to establish communication with the pumping system, the atmosphere or the system whose pressure is to be measured as the case may be, and for manipulating the movement of the liquid during preparation for use as will be explained hereinafter.

The three-way stopcock 8 provides a means for selective communication either directly with the pumping system or with the gas system whose pressure is to be measured, as the case may be. The relative position of the reservoirs, their dimensions, etc., are in general as indicated in the illustration. The position of reservoir 1 must, however, be such as to insure against a differential mercury height in excess of 30 inches (approximately barometric height), so as to make possible free movement of the mercury through the whole apparatus when so desired. The greater the oil reading range desired, the higher the mercury reservoir 1 must thus be set up. Reservoirs 1 and 2 are positioned in different arms of the same U-tube and reservoir 3 is located in the other U-tube, in the arm thereof more remote from reservoir 2. The exact position of reservoir 2 in its U-tube arm may be varied, according to the point where it is desired to separate or break the junction of the mercury and other light manometric liquid when preparing the device for use but is preferably placed near the top. The position of reservoir 3 with its lower stopcock 5 in the U-tube arm may be varied but should preferably be as close to the bottom of the U as practicable. The other arm of the U (tube 20) may be varied in length, but both of these factors—the position of reservoir 3 and length of tube 20—will be the determining factors of the total range of pressures for which the instrument can be used.

In order to maintain a Torricellian reference vacuum, the oil or other light liquid used must have a very low vapor pressure and be free from volatile impurities to insure against the filling of reservoir 2 with vapors. These properties, as is well recognized, are necessary for liquids used in manometric work.

In preparing the gauge for use, the requisite quantity of purified mercury is introduced into reservoir 1 by way of opening 10 (ordinarily kept closed by rubber stopper), and stopcock 6 by applying slight suction through 8 and is allowed to fill the capillary tube up to bottom of reservoir 2. The mercury is then locked in position by stopcock 4. The rest of the system (reservoirs 2, 3, capillary, etc.) is then evacuated by communication through the pump by way of stopcocks 6, 7 and 5. Stopcock 7 is then locked and the requisite quantity of purified oil, ester, or other non-volatile liquid is introduced through opening 11 and drawn into reservoir 3 through stopcock 7 and thence through 5 into reservoir 2. By proper manipulation of appropriate stopcocks the mercury layer and its overlying oil layer are then adjusted in level in reservoir 2 to a point about one-half or two-thirds full in the reservoir. Stopcock 4 is then locked. Suction is applied to both sides of the system by way of the pump through stopcock 8 and pumping continued until no further gas evolution is evident. Heat may be applied to hasten the degassing process. Reservoir 1 is then opened to the atmosphere and by manipulation of appropriate stopcocks, mercury and oil are pushed upward, the oil layer being sent through the capillary and, in part, into reservoir 3 until the top of the mercury column (juncture of mercury and oil) is above the top of reservoir 2. The oil layer is then locked by stopcock 5 and, with the pump operating continuously, the three-way stopcock 6 is turned to evacuate reservoir 1. When the pressure has been sufficiently lowered, the mercury thread will break at the mercury-oil juncture and the mercury column is then allowed to drop and empty reservoir 2. Stopcock 4 is then locked. There is thus produced a Torricellian vacuum 27 between the mercury 28 and the oil or other light manometric liquid used 29 (essentially the space in reservoir 2). Moreover, since reservoir 2 is relatively large, the effect of any trace of residual gas in the mercury or oil that had not been removed in the degassing process is so minimized as to constitute a negligible factor. With the pump operating continuously, stopcock 5 is now opened, the oil column drawn over to a convenient level, locked again by 5 and is now ready for use. Communication with the system to be measured is made through stopcock 8. Stopcock 5 is opened and differential pressure read directly as in the ordinary mercury U type manometer. Communication with the atmosphere, when and as needed is obtained through valves 6 and 7 and vent tubes 25 and 26.

While any well ground, long-barrelled stopcock can be used for stopcock 5, the mercury-sealed, or grease-sealed stopcock (shown in Figure 2) is preferred. The mercury or grease sealing agent is introduced into the stopcock through openings 15.

The bores, respectively, of the tube below the stopcock, the plug, and the tube above the stopcock are progressively larger, as shown in 12, 13 and 14, in order to prevent the trapping of air bubbles.

In the device as used by me an ordinary U-type mercury manometer 16 with its stopcock 9, may be attached to tubing 22 at the point 24 and is used merely for the purpose of comparisons between its readings and the readings of the improved manometer.

Having fully disclosed my discovery, I claim:

1. A vacuum gauge comprising a double U-tube manometer the arms of one U-tube being connected to different arms of the other U-tube at the upper ends of all the arms, thereby forming a continuous tubular passage, a mercury column partly filling and in the lower portion of one U-tube, a column of a non-volatile liquid of low specific gravity partly filling and in the lower portion of the other U-tube, there being a Torricellian vacuum within the tubular passage between the two columns of liquids, adjustable valves, inlets and vent tubes and reservoir means communicating with said tubes to establish said Torricellian vacuum between the liquid columns and valve connecting means for communication between the gauge and the vacuum to be measured.

2. In a vacuum gauge having a double U-tube manometer the arms of one U-tube being connected to different arms of the other U-tube at the upper ends of all the arms, thereby forming a continuous tubular passage and having a mercury column and a column of a light manometric liquid in said manometer, and valve means for use in establishing a Torricellian vacuum between the mercury column and the column of light manometric liquid.

3. A vacuum gauge comprising a double U-tube manometer, the arms of one U-tube being connected to different arms of the other U-tube at the upper ends of all the arms, thereby forming a continuous tubular passage, an arm of one U-tube having a mercury reservoir therein, positioned to insure against a differential mercury height in excess of 30 inches, the other arm of the same U-tube having a degassing chamber therein, the arm of the other U-tube more remote from the degassing chamber having a reservoir therein, a mercury column partly filling and in the lower portion of the U-tube having the mercury reservoir, a column of a light manometric liquid partly filling and in the lower portion of the other U-tube, there being a Torricellian vacuum within the tubular passage between the two columns of liquids, adjustable valves in the tubes below and above the mercury reservoir and the third mentioned reservoir and adjustable inlet and vent tubes connected with said tubes and upper valves.

4. In a vacuum gauge a double U-tube manometer, the arms of one U-tube communicating with different arms of the other U-tube at the upper ends of all the arms, thereby forming a continuous tubular passage, a mercury column partly filling and in the lower portion of one U-tube, a column of a light manometric liquid partly filling and in the lower portion of the other U-tube and there being a Torricellian vacuum within the tubular passage between the two columns of liquids.

SAMUEL PALKIN.